US012361586B2

(12) United States Patent
Lee et al.

(10) Patent No.: US 12,361,586 B2
(45) Date of Patent: Jul. 15, 2025

(54) CONTACTLESS LOCATION INFORMATION ACQUISITION APPARATUS AND LOCATION INFORMATION ACQUISITION METHOD USING THE SAME

(71) Applicant: Korea Institute of Machinery & Materials, Daejeon (KR)

(72) Inventors: Minyoung Lee, Seoul (KR); Moo Hyun Cha, Daejeon (KR); Geunho Lee, Daejeon (KR); Dongwook Lee, Daejeon (KR); Hanmin Lee, Yongin-si (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 151 days.

(21) Appl. No.: 17/776,403

(22) PCT Filed: Nov. 6, 2020

(86) PCT No.: PCT/KR2020/015537
§ 371 (c)(1),
(2) Date: May 12, 2022

(87) PCT Pub. No.: WO2021/101142
PCT Pub. Date: May 27, 2021

(65) Prior Publication Data
US 2022/0405960 A1    Dec. 22, 2022

(30) Foreign Application Priority Data

Nov. 19, 2019    (KR) .................. 10-2019-0148839

(51) Int. Cl.
*G06T 7/73*        (2017.01)
*G06T 7/246*       (2017.01)
(Continued)

(52) U.S. Cl.
CPC ............... *G06T 7/73* (2017.01); *H04N 23/56* (2023.01); *G06T 2207/10152* (2013.01)

(58) Field of Classification Search
None
See application file for complete search history.

(56) References Cited

U.S. PATENT DOCUMENTS 6,856,696 B1 *   2/2005   Ajioka ................. G06V 20/695
                                                        382/302
10,139,217 B1 *  11/2018  Holt ....................... G03B 17/54
(Continued)

FOREIGN PATENT DOCUMENTS

JP    2016-170522 A    9/2016
JP    2017-188118 A    10/2017
(Continued)

OTHER PUBLICATIONS

International Search Report for International Application No. PCT/KR2020/015537 dated Apr. 15, 2021.

*Primary Examiner* — Hung Q Dang
(74) *Attorney, Agent, or Firm* — Harness, Dickey & Pierce, P.L.C.

(57) ABSTRACT

In a contactless location information acquisition apparatus and a location information acquisition method using the acquisition apparatus, the acquisition apparatus includes an imaging part, a modulation part and a controller. The imaging part is spaced apart from a moving object, and is configured to take picture of the object in a predetermined exposure time. The modulation part is configured to generate a motion blur to the pictured image, and is configured to move the imaging part to a predetermined first pattern, so as for the motion blurred image to have a second pattern. The controller is configured to obtain a location of the object from the motion blurred image for the exposure time.

13 Claims, 16 Drawing Sheets

(51) Int. Cl.
  *G06T 7/593* (2017.01)
  *G06T 7/70* (2017.01)
  *H04N 23/56* (2023.01)

(56) References Cited

U.S. PATENT DOCUMENTS

2006/0140481 A1* 6/2006 Kim .................. G06T 7/246
  348/208.1
2013/0329006 A1* 12/2013 Boles .................. H04N 9/73
  348/42

FOREIGN PATENT DOCUMENTS

| JP | 2018-136191 A | 8/2018 |
| KR | 100902389 B1 | 6/2009 |
| KR | 10-2011-0137955 A | 12/2011 |
| KR | 10-2012-0004132 A | 1/2012 |
| KR | 10-2013-0042989 A | 4/2013 |
| KR | 10-2013-0125713 A | 11/2013 |
| KR | 10-2018-0053119 A | 5/2018 |
| KR | 102026268 B1 | 9/2019 |
| KR | 102121367 B1 | 6/2020 |

\* cited by examiner

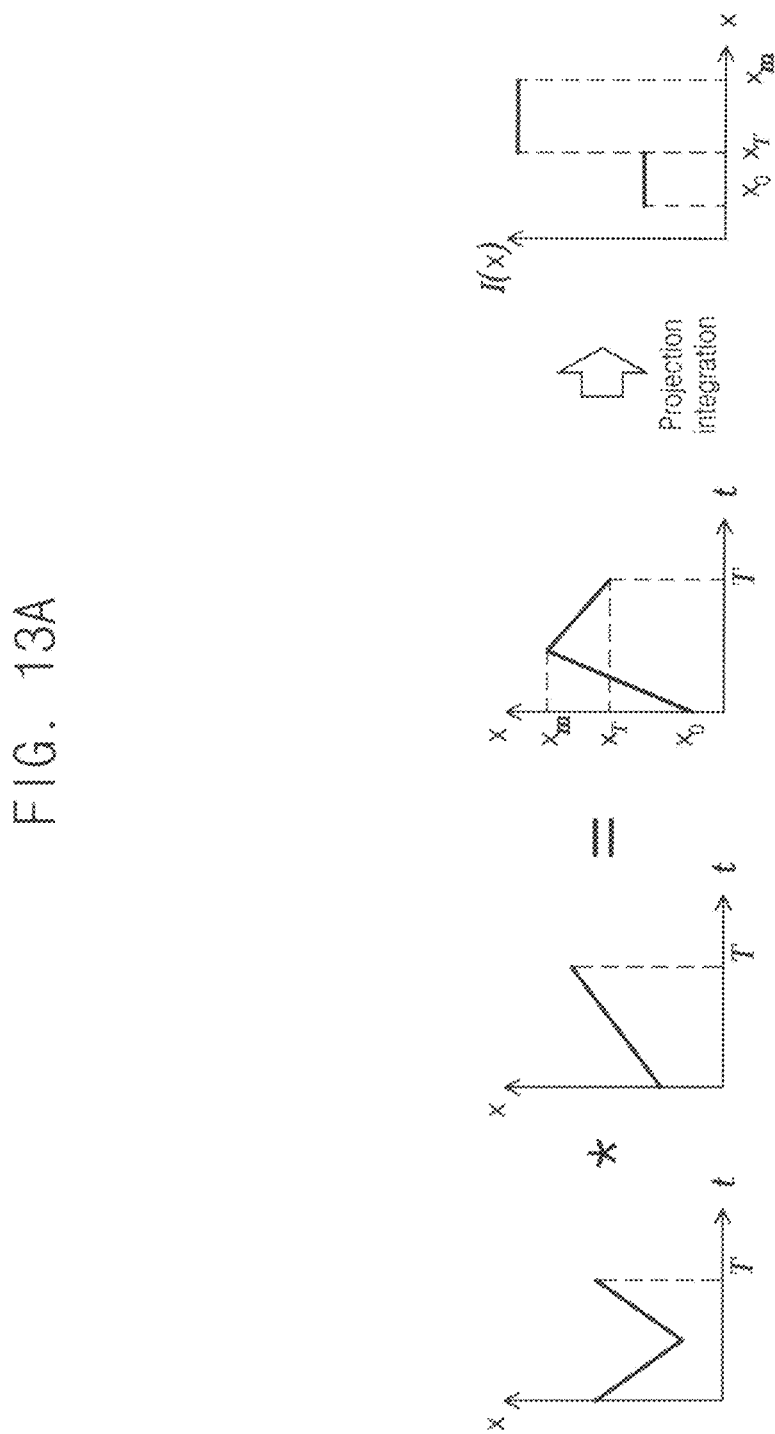

CONTACTLESS LOCATION INFORMATION ACQUISITION APPARATUS AND LOCATION INFORMATION ACQUISITION METHOD USING THE SAME

CROSS-REFERENCE TO RELATED APPLICATIONS

This application is a national phase under 35 U.S.C. § 371 of PCT International Application No. PCT/KR2020/015537 which has an International filing date of Nov. 6, 2020, which claims priority to Korean Application No. 10-2019-0148839, filed Nov. 19, 2019, the entire contents of each of which are hereby incorporated by reference.

BACKGROUND

1. Field of Disclosure

The present disclosure of invention relates to a contactless location information acquisition apparatus and a location information acquisition method using the same, and more specifically the present disclosure of invention relates to a contactless location information acquisition apparatus and a location information acquisition method using the same, capable of obtaining location information using light modulation and lens position modulation in a non-contact type.

2. Description of Related Technology

A vibration of a driver such as an engine, a motor and so on is one of important indicators, to measure performance of the driver. However, in the conventional measuring device, the number of the sensors attached to the driver is limited, and the results may differ from the positions of the sensors attached to the driver. Further, the sensor may be detached from the driver, as the driver moves.

In addition, an inertia of the sensor itself may be one of the reasons decreasing the precision of the contact type measuring device. For example, when the sensor is directly attached to the engine or the motor with high temperature, drift phenomenon in which the measured value is drifted to a specific direction may occur, and the measuring error may increase.

In Korean patent No. 10-2121367, a contactless optical measuring device and a method using the same are disclosed, and a position of an optical part is elevated or lowered in the contactless optical measuring device.

However, even though the position of the optical part is changed as in the above prior art, the measuring error is caused due to the position of the driver. Thus, the measuring error should be minimized.

SUMMARY

The present invention is developed to solve the above-mentioned problems of the related arts. The present invention provides a contactless location information acquisition apparatus capable of obtaining location information of an object more precisely and more accurately in a non-contact type using light modulation and lens position modulation.

In addition, the present invention also provides a location information acquisition method using the contactless location information acquisition apparatus.

According to an example embodiment, the acquisition apparatus includes an imaging part, a modulation part and a controller. The imaging part is spaced apart from a moving object, and is configured to take picture of the object in a predetermined exposure time. The modulation part is configured to generate a motion blur to the pictured image, and is configured to move the imaging part to a predetermined first pattern, so as for the motion blurred image to have a second pattern. The controller is configured to obtain a location of the object from the motion blurred image for the exposure time.

In an example, the acquisition apparatus may further include a light source and a reflecting member. The light source may be spaced apart from the object, and may be configured to irradiate a light to the object. The reflecting member may be attached to a pictured surface of the object, and may be configured to reflect the light irradiated from the light source. The imaging part may be configured to take picture of the light reflected from the reflecting member, to obtain the image.

In an example, the controller may be configured to obtain the location of the object according to the time, based on the location of the first pattern and the location of the second pattern.

In an example, the controller may be configured to obtain the location of the object according to the time, based on the pattern of the light irradiated from the light source additionally.

In an example, the pattern of the light may be performed by changing at least one of light intensity and light wavelength for the exposure time into a predetermined pattern.

In an example, the light source may be a light emitting diode (LED), and a red light, a green light and a blue light of the LED may be emitted sequentially with a predetermined pattern or at the same time to perform the pattern of the light.

In an example, the imaging part may include a plurality of cameras, to take picture of each of feature points of the object.

In an example, each of the cameras may move with a different pattern, to form direction vectors of the cameras substantially perpendicular to each other.

In an example, at least one of the feature points may be located on a surface different from the surface of the object on which different feature points are formed.

According to another example embodiment, in an acquisition method, an imaging part moves with a predetermined first pattern and a moving object is taken picture of in a predetermined exposure time, to generate a motion blurred image having a second pattern. A location of the second pattern is obtained from the motion blurred image. A location of the object is obtained for the exposure time, based on the first pattern and the second pattern In an example, in generating the motion blurred image, a modulation part connected to the imaging part may move at least one of a body, a lens and an image sensor of the imaging part with the first pattern for the exposure time.

In an example, before generating the motion blurred image, a light may be irradiated to the object from a light source spaced apart from the object, to obtain a reflected light from the object.

In an example, in obtaining the location of the object, the location of the object may be obtained according to the time, based on the location of the first pattern and the location of the second pattern.

In an example, in irradiating the light to the object, at least one of light intensity and light wavelength irradiated to the object, may be changed into a predetermined pattern.

In an example, in obtaining the location of the object, the location of the object may be obtained according to the time, based on the pattern of the light irradiated from the light source additionally.

In an example, in generating the motion blurred image, each of feature points of the object, may be taken picture of using the imaging part having a plurality of cameras.

In an example, in generating the motion blurred image, each of the cameras may move with a different pattern, to form direction vectors of the cameras substantially perpendicular to each other.

According to the present example embodiments, the imaging part for taking picture of the object moves in a random pattern, and the motion blur is generated to the pictured image, and thus the movement of the object may be obtained reversely.

In addition, the results are not limited by a frame rate of the imaging part, and time resolution is increased by controlling the light source, so that the location of the object moving with relatively high frequency may be obtained with high resolution, high accuracy and high precision.

Here, the moving pattern of the imaging part, the intensity of the light or the wavelength of the light from the light source are controlled according to the time, and thus the time resolution may be increased in obtaining the location of the object. Thus, the results are not limited by the frame rate of the camera, and the location of the object moving with relatively high frequency may be obtained with high resolution, high accuracy and high precision, without a high performance image processor.

BRIEF DESCRIPTION OF THE DRAWINGS

FIG. 12A, FIG. 12B, FIG. 13A and FIG. 13B are graphs for additional explanation on the acquisition apparatus and the acquisition method according to the example embodiments of FIG. 1 to FIG. 11.

Figure 1:
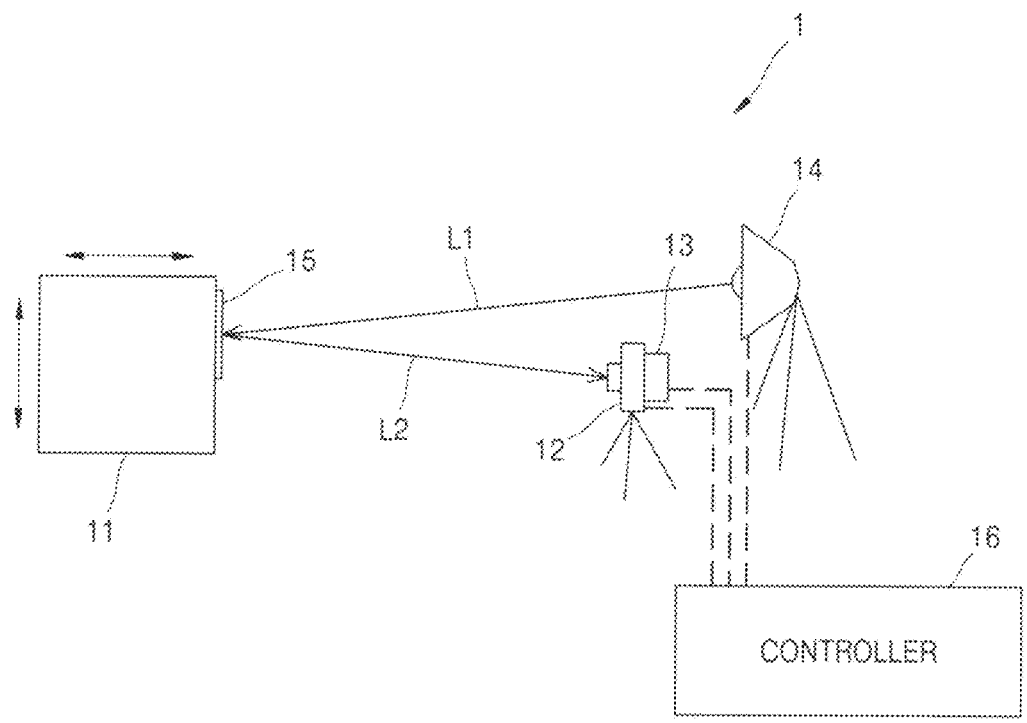
FIG. 1 is a schematic diagram illustrating a contactless location information acquisition apparatus according to an example embodiment of the present invention.

| * Reference numerals | |
|---|---|
| 1, 2: a contactless location information acquisition apparatus | |
| 11: object | 12: imaging part |
| 13: modulation part | 14: light source |
| 15: reflecting member | 16: controller |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs.

Hereinafter, example embodiments of the present invention are explained in detail referring to the figures.

Figure 2:
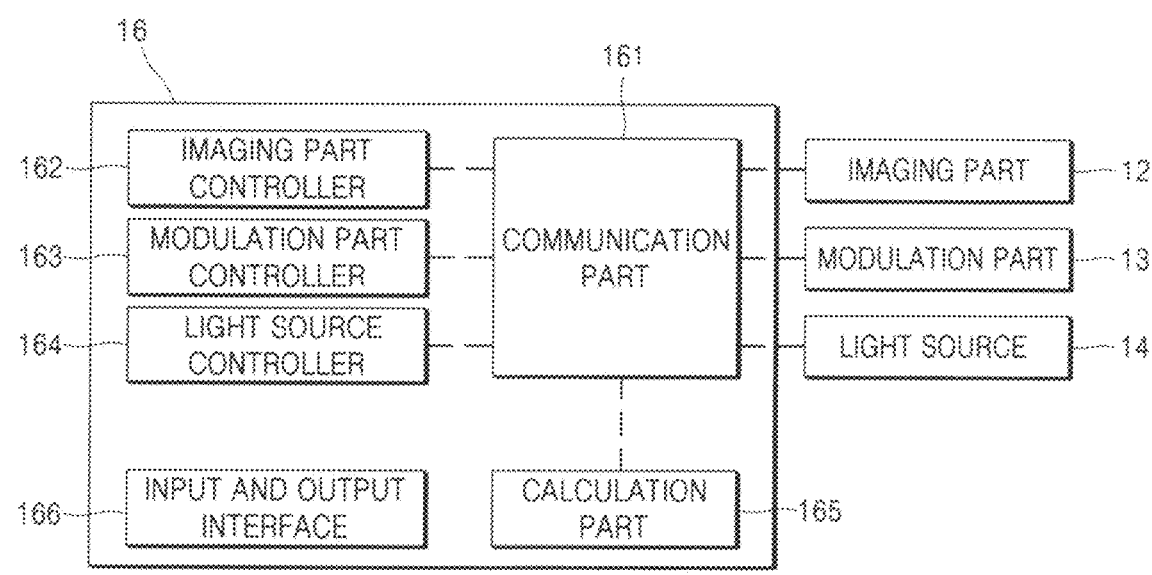
FIG. 2 is a block diagram illustrating a controller of FIG. 1.

FIG. 1 is a schematic diagram illustrating a contactless location information acquisition apparatus according to an example embodiment of the present invention. FIG. 2 is a block diagram illustrating a controller of FIG. 1.

Referring to FIG. 1 and FIG. 2, a contactless location information acquisition apparatus 1 (hereinafter, acquisition apparatus) includes an imaging part 12, a modulation part 13 and a controller 16. The imaging part 12 is spaced apart from a moving object 11, and is configured to take picture of the object 11 in a predetermined exposure time. The modulation part 13 is configured to generate a motion blur to the pictured image, and is configured to move the imaging part 12 to a predetermined first pattern, so as for the motion blurred image to have a second pattern. The controller 16 is configured to obtain a location of the object 11 from the motion blurred image for the exposure time.

Here, the motion blur is a stripe shape formed in the pictured image, when a relative position between a camera and an object changes in the exposure time. In the present example embodiment, the imaging part 12 moves in a specific pattern for the exposure time, to generate the motion blur in the pictured image, and then the location (which is a position information) of the object 11 is obtained.

The imaging part 12 is spaced apart from the object 11. The imaging part 12 takes picture of the light reflected from the object 11 for the predetermined exposure time, and then obtains the image of the object 11. The object 11 may be entirely taken picture of. Alternatively, a single point or a plurality of points on a pictured surface of the object 11 may be taken picture of.

For the convenience of explanation, hereinafter, the imaging part 12 takes picture of the single point or the plurality of points on the pictured surface of the object 11. The imaging part 12 may be a camera including a lens and an image sensor, but not limited thereto.

The object 11 is a target, the location information of which is obtained. The location information includes a frequency of the object 11, a position of the object 11 according to a time, a velocity of the object according to the time, and so on. The object 11 may be an engine or a motor, but not limited thereto, and may have various kinds of motions.

The modulation part 13 makes a specific motion to the imaging part 12.

During the imaging part 12 takes picture of the object 11, the modulation part 13 moves the imaging part 12 with a predetermined pattern. The modulation part 13 is not limited to any specific structure, and is enough to move the imaging part 12 with the predetermined pattern based on a direction.

For example, the modulation part 13 may move the imaging part 12 linearly using a ball screw motor and a linear guide. Alternatively, the modulation part 13 may move the imaging part 12 to be vibrated with a predetermined frequency, using an elastic element like a spring. Further, the imaging part 12 is a part of the modulation part 13, and the modulation part 13 may be a grooved cam, a cylindrical cam, a conical cam and so on which moves along a groove which is formed along a predetermined pattern.

Accordingly, the modulation part 13 moves the imaging part 12 with a first pattern which is predetermined. Thus, during the imaging part 12 takes picture of the object 11 for the exposure time, the movement of the imaging part 12 along the first pattern is added to the original movement of the object 11, and then the relative position between the object 11 and the imaging part 12 may change.

Then, a motion blur occurs at the image pictured by the imaging part 12, and the generated motion blur may have a second pattern. The movement of the imaging part 12 with the first pattern is added to the original movement of the object 11, and then the motion blurred image having the second pattern is generated. The second pattern of the motion blurred image may be a traceable pattern unlike the movement of the object 11.

Figure 3A:
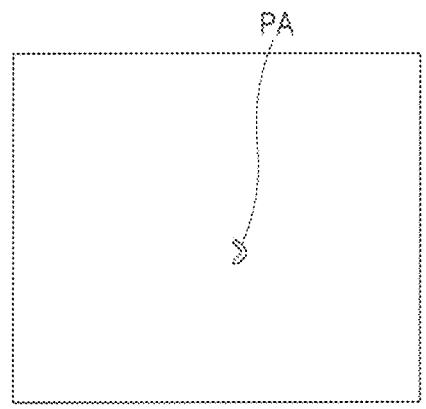
FIG. 3A, FIG. 3B and FIG. 3C are series of motion blurred image generating states using the acquisition apparatus of FIG. 1.
Figure 3B:
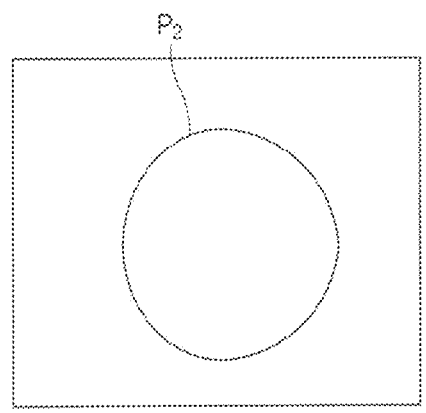
Figure 3C:
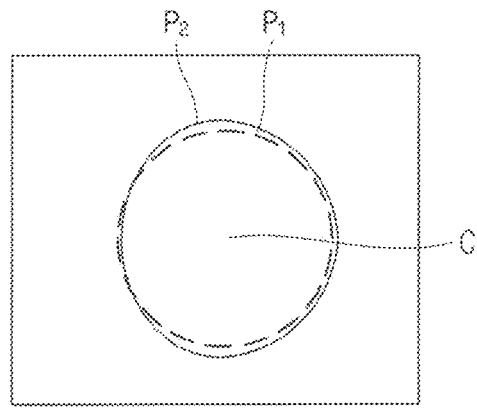
Figure 3D:
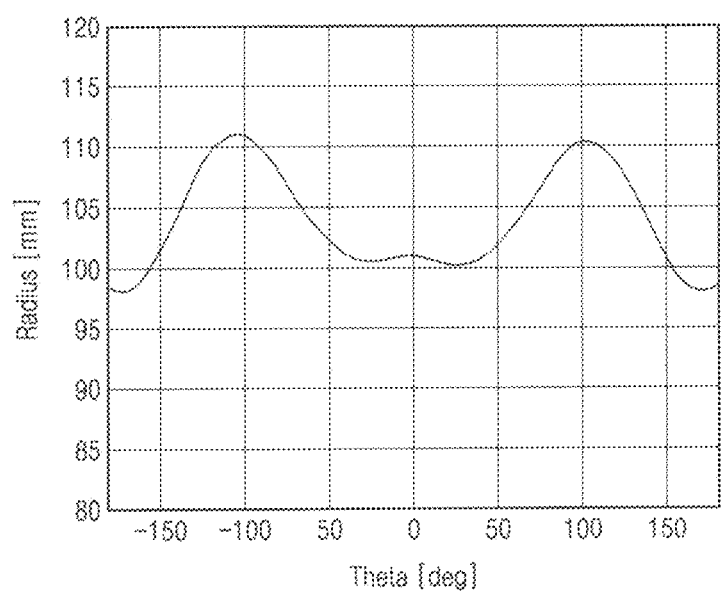
FIG. 3D is a graph showing a second pattern as a polar coordinate system.

FIG. 3A, FIG. 3B and FIG. 3C are series of motion blurred image generating states using the acquisition apparatus of FIG. 1, and FIG. 3D is a graph showing a second pattern as a polar coordinate system.

Referring to FIG. 3A, the object 11 may move with a pattern $P_A$ having a relatively high frequency. Conventionally, a frame rate of the imaging part increases to correspond to the frequency of the movement of the object 11, to obtain the location of the object 11. However, the imaging part should have relatively high frame rate, and a calculation of an image processer is rapidly increased as the number of the images increases, and thus economic efficiency and utility may be very low.

In contrast, in the present example embodiment, the modulation part 13 is used to move the imaging part 12 with a predetermined pattern, to generate the motion blurred image, and then the location of the object 11 is obtained.

For example, referring to FIGS. 3B and 3C, the imaging part 12 moves along a first pattern $P_1$ by the modulation part 13, and takes picture of the object 11. Here, for the exposure time of the imaging part 12, the motion blur occurs according as the relative positon between the object 11 and the imaging part 12 changes, and thus, the motion blurred image having a second pattern $P_2$ is generated. Here, the second pattern $P_2$ is the sum of the movement of the object 11 and the first pattern $P_1$ of the imaging part 12.

Here, the size, the shape and so on of the first pattern $P_1$ is not limited, but, as illustrated in FIG. 3C, the size of the first pattern $P_1$ may be larger than the pattern $P_A$ of the object 11. Thus, the motion blurred image is larger than the pattern $P_A$ of the object 11 and have the traceable second pattern $P_2$. In addition, to measure the location of the second pattern $P_2$, especially the frequency of the second pattern $P_2$, time resolution may be increased, and then the location of the object 11 may be obtained more precisely and more accurately.

In addition, as illustrated in FIG. 3C, the first pattern $P_1$ has a circular or elliptical shape. Thus, the second pattern $P_2$ of the motion blurred image may be expressed as R-θ polar coordinate system with respect to a center C of the first pattern $P_1$.

Here, the shape of the first pattern $P_1$ changes as the motion state of the object 11, and the second pattern $P_2$ may be expressed as the Cartesian coordinate system. But, for the convenience of explanation, the first pattern $P_1$ in the present example embodiment is explained to have the circular or elliptical shape.

As explained above, for the object 11 in motion that is difficult to track, the imaging part 12 taking picture of the object 11 moves with the predetermined first pattern $P_1$, and then the motion blurred image having the traceable second pattern $P_2$ is generated. Thus, as illustrated in FIG. 3D, the second patter $P_2$ is expressed in the polar coordinate system, and then the location of the second pattern $P_2$ of the motion blurred image may be obtained.

The modulation part 13 moves the whole imaging part 12 with the predetermined pattern, or moves a specific portion of the imaging part 12 with the predetermined pattern.

For example, when the imaging part 12 is a camera, a body of the camera, a lens of the camera, an image sensor of the camera and so on may be moved selectively. Here, the modulation part 13 may have a proper size and a proper shape based on the elements of the camera which are to be moved. In addition, the modulation part 13 may be disposed on a proper position of the elements of the camera which are to be moved.

The acquisition apparatus 1 according to the present example embodiment may further include a light source 14 and a reflecting member 15. The light source 14 may be spaced apart from the object, or may be attached to the object 11. The light source 14 is configured to irradiate a light to the object 11, and the imaging part 12 takes picture of the light reflected from the object 11. Here, the light source 14 may be a light emitting diode (LED), but not limited thereto. The controller 16 may control an intensity of the light or/and a frequency of the light.

In the present example embodiment, the light from the light source 14 may be a white light, and the light having the same frequency without a predetermined pattern may be provided.

The reflecting member 15 is attached to the pictured surface of the object 11, and the kinds, the shape, the size and the position of the reflecting member 15 are not limited. The reflecting member 15 may be appropriately selected to obtain the image of the object 11 using the imaging part 12. Thus, the light L1 is irradiated from the light source 14, and the light L2 is reflected by the reflecting member 15 attached to the pictured surface of the object 11. The reflected light is incident into the imaging part 12, and the imaging part 12 takes picture of the reflected light to obtain the image of the object 11.

For example, when the object 11 is the engine, the light source 14 and the reflecting member 15 are equipped in an engine room where the light is insufficient, and thus the image of the object 11 may be obtained more clearly.

Referring to FIG. 1 and FIG. 2, the controller 16 may be disposed at a side of the acquisition apparatus 1. The controller 16 is connected to the imaging part 12, the modulation part 13 and the light source 14, and controls the operation of the imaging part 12, the modulation part 13 and the light source 14.

Here, the controller 16 includes a communication part 161, an imaging part controller 162, a modulation part controller 163, a light source controller 164, a calculation part 165, and an input and output interface 166.

The imaging part controller 162 controls specific imaging conditions of the imaging part 12 considering the characteristics of the object 11. For example, the quantity of the light incident into the imaging part 12 may be considered, to control the exposure time or the iris value of the imaging part 12.

The modulation part controller 163 controls the modulation part 13, to provide the specific motion to the imaging part 12. The specific motion provided to the imaging part 12 may be selected considering the characteristics of the object 11. For example, the modulation part controller 163 may control the modulation part 13, to move the imaging part 12 with the predetermined first pattern.

The light source controller 164 controls the light source 14, to control the light incident into the object 11 or the reflecting member 15. For example, when the object 11 moves with high frequency, the time resolution should be enhanced to obtain the location of the object 11 more precisely and more accurately. Thus, in the present example embodiment, the light source controller 164 controls the intensity of the light source 14 or/and the frequency of the light source 14, to enhance the time resolution. In addition, when the LED is used as the light source 14, the intensity of each of red, green and blue LEDs or/and the frequency thereof is independently controlled, to control the RGB value of the LED, and then the time resolution may be enhanced.

The specific control for the light source 14 is explained below in detail, and in the present example embodiment, the light provided from the light source 14 may be the white light having the constant intensity and frequency.

The imaging part controller 162, the modulation part controller 163 and the light source controller 164 are respectively communicated with the imaging part 12, the modulation part 13 and the light source 14 via the communication part 161.

The input orders from the imaging part controller 162, the modulation part controller 163 and the light source controller 164 are respectively transmitted to the imaging part 12, the modulation part 13 and the light source 14 via the communication part 161. In addition, the image of the object 11 generated from the imaging part 12, or the output data from the imaging part 12, the modulation part 13 and the light source 14 are respectively fed back to the imaging part controller 162, the modulation part controller 163 and the light source controller 164 via the communication part 161.

Here, the communication part 161 is configured to transmit the data between the controllers 16, or to transmit the data from the controller 16 to outer parts, and any communication devices may be used.

The calculation part 165 calculates to obtain the location information of the object 11, based on the motion blurred image from the imaging part 12, and further explanation on the calculation part 165 is followed below in FIG. 4A to FIG. 4D.

Figure 4A:
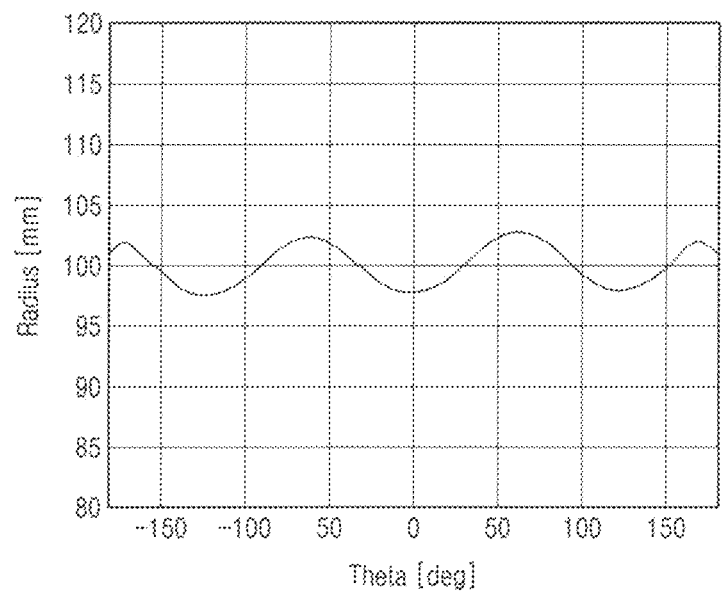
FIG. 4A is a graph showing a result of a location of the object as the polar coordinate system, using the acquisition apparatus of FIG. 1.
Figure 4B:
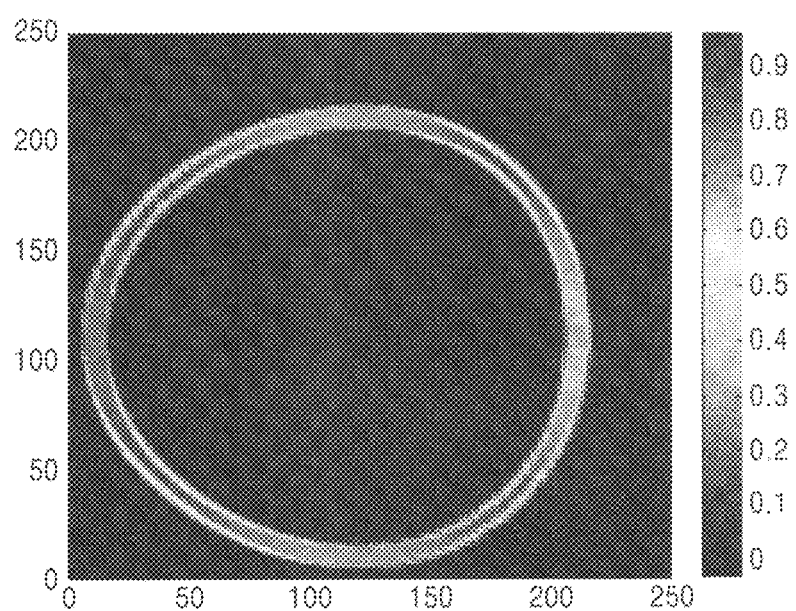
FIG. 4B is an image showing a density map of the motion blurred image.
Figure 4C:
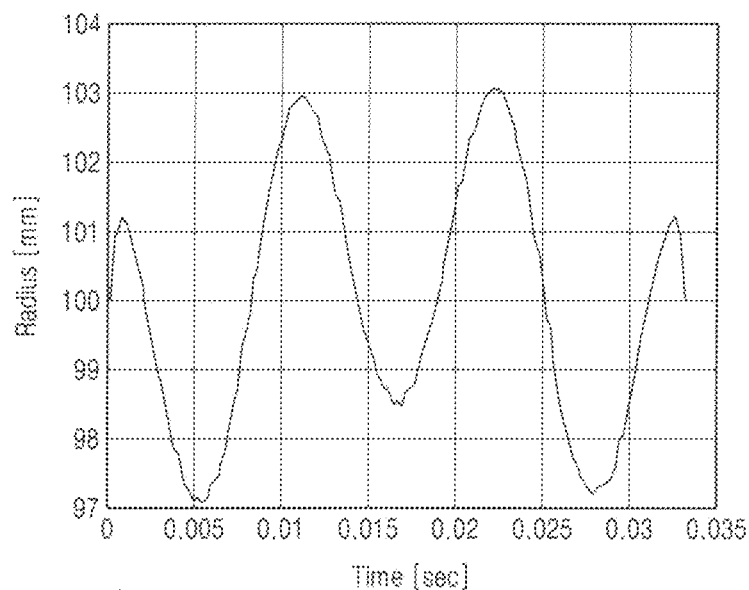
FIG. 4C is a graph showing the location of a second pattern.
Figure 4D:
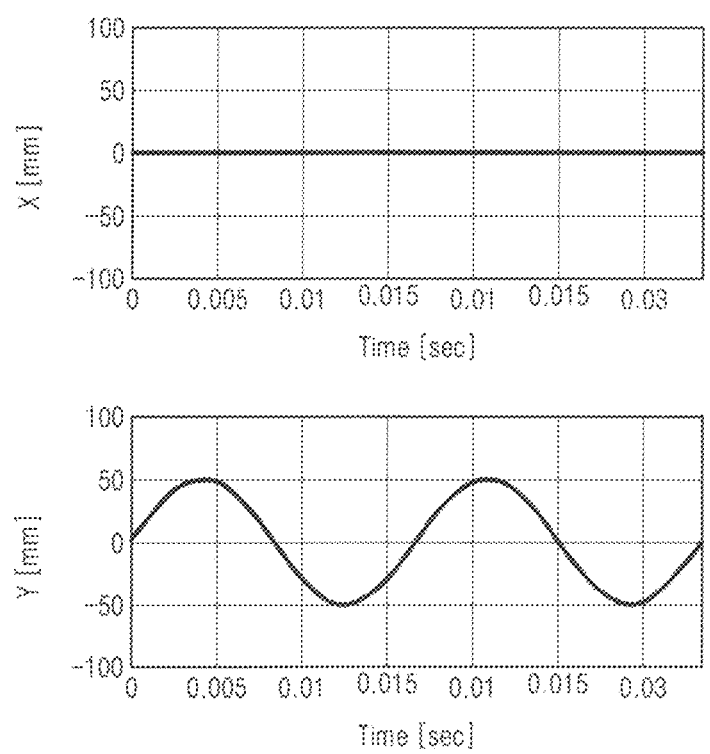
FIG. 4D is a graph showing the location of the object with respect to a time.

FIG. 4A is a graph showing a result of a location of the object as the polar coordinate system, using the acquisition apparatus of FIG. 1, FIG. 4B is an image showing a density map of the motion blurred image, FIG. 4C is a graph showing the location of a second pattern, and FIG. 4D is a graph showing the location of the object with respect to a time.

The calculation part 165 calculates the location information on the second pattern $P_2$ of the motion blurred image pictured by the imaging part 12. Then, as illustrated in FIG. 4B, the location of the second pattern $P_2$ may be expressed as the R-θ polar coordinates system. Here, the center C may be a center of the first pattern $P_1$.

The calculation part 165 calculates the density information of the motion blurred image, based on the location of the second pattern $P_2$. For example, the calculation part 165 may form the density map on the second pattern $P_2$ of the motion blurred image as illustrated in FIG. 4B, based on the second pattern $P_2$ expressed in the polar coordinate system as in FIG. 4A and the light intensity and/or frequency recorded in the image sensor of the imaging part 12 for the exposure time. Here, the density map is the result of mapping the information on the light intensity and/or frequency recorded in the image sensor of the imaging part 12 for the exposure time into the second pattern $P_2$.

FIG. 4B shows the density map in which the information on the light frequency is mapped on the second pattern $P_2$ expressed as the Cartesian coordinate system with respect to a random origin 0 which is positioned at a left lower side.

The calculation part 162 generates the location information of the second pattern $P_2$ according to the time, based on the density map in which the information on the light intensity and/or frequency of the second pattern $P_2$ of the motion blurred image is mapped. For example, the exposure time of the imaging part 12, the irradiation time of the light source 14, and the light intensity and/or frequency are known information, and thus, as illustrated in FIG. 4C, the location of the second pattern $P_2$ may be expressed with respect to the time. In FIG. 4C, the location of the second pattern $P_2$ is expressed as a radius with respect to the origin, but not limited thereto.

The calculation part 165 calculates the location information of the object 11 reversely. For example, the calculation part 165 excludes the movement of the first pattern $P_1$ according to the time, on the movement of the second pattern $P_2$ according to the time, and thus, the movement of the object 11 according to the time which is the location of the object 11 may be obtained finally.

FIG. 4D shows the location information of the object 11 on a plane according to the time, which is the positon in the X axis and Y axis, but not limited thereto. For example, the location information of the object 11 may be expressed as the distance of the first pattern $P_1$ from the origin according to the time.

Accordingly, the acquisition apparatus 1 according to the present example embodiment obtain the location of the object 11, without increasing the frame rate of the imaging part 12 or using expensive processors. The modulation part 13 moves the imaging part 12 with the specific motion, to generate the motion blur, and then the light intensity and/or frequency irradiated from the light source is controlled (explained in detain below) to obtain the location information of the object moving with high frequency, more precisely, more accurately and with high resolution.

Figure 5:
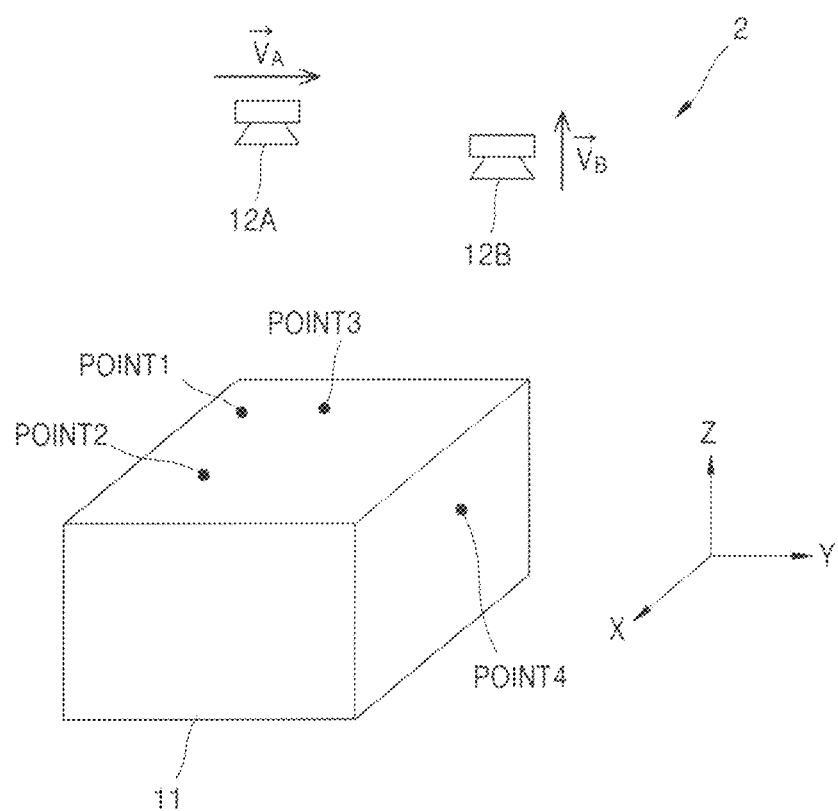
FIG. 5 is a schematic diagram illustrating a contactless location information acquisition apparatus according to another example embodiment of the present invention.

FIG. 5 is a schematic diagram illustrating a contactless location information acquisition apparatus according to another example embodiment of the present invention.

The acquisition apparatus 2 according to the present example embodiment is substantially same as the acquisition apparatus 1 in FIG. 1 to FIG. 4D, except that a plurality of cameras is used to take picture of a plurality of points in the object, and thus any repetitive explanation will be omitted.

Referring to FIG. 5, in the acquisition apparatus 2 according to the present example embodiment, the imaging part 12 includes a plurality of cameras. In FIG. 5, first and second cameras 12A and 12B are illustrated, but more than 2 cameras may be included. But, for the convenience of explanation, hereinafter, the imaging part 12 is explained to include the first and second cameras 12A and 12B. Here, the modulation part 13 may be connected to each of the first and second cameras 12A and 12B.

Here, the first camera 12A is spaced apart from the second camera 12B, and each camera may move differently. For example, when the object 11 moves along the same direction of the imaging part 12, the relative position change between the object 11 and the imaging part 12 is offset, and thus the motion blur may be insufficient in the pictured image.

Thus, in the acquisition apparatus 2 of the present example embodiment, the first and second cameras 12A and 12B moves with a different pattern. Then, even though the object 11 moves along the same direction of one of the first and second cameras 12A and 12B, the motion blur due to the remaining camera may be sufficiently formed in the pictured image.

In addition, the target pictured by the first and second cameras 12A and 12B in the acquisition apparatus 2 may be a plurality of feature points on the pictured surface of the object 11.

For example, as illustrated in FIG. 5, each of the first and second cameras 12A and 12B may take picture of first, second, third and fourth points POINT 1, POINT 2, POINT 3 and POINT 4 on the pictured surface of the object 11. Thus, the motion blurred image is formed for each of the feature points of the object 11, and the location of the feature points may be obtained. Here, the number of the feature points on the pictured surface of the object 11 is not limited.

Thus, even though the object 11 does not have a single motion state in a whole and the object 11 partially has a different motion state due to the difference of the material, that of the distance from the vibration source, that of the fastened strength and so on, the location information of the object 11 corresponding to each feature point may be obtained.

Figure 6A:
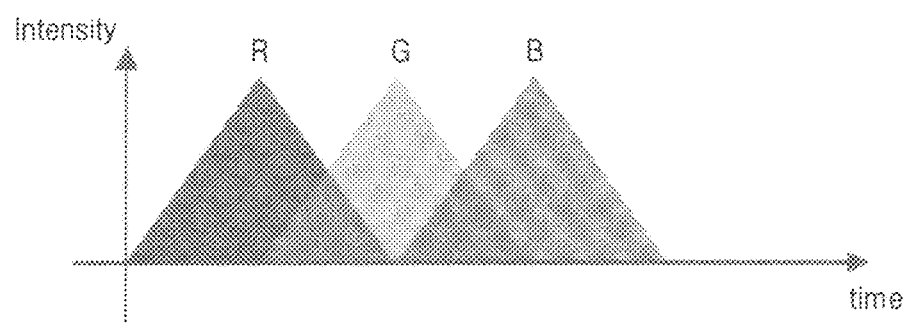
FIG. 6A is a graph showing a light source, provided by a contactless location information acquisition apparatus according to still another example embodiment of the present invention.
Figure 6B:
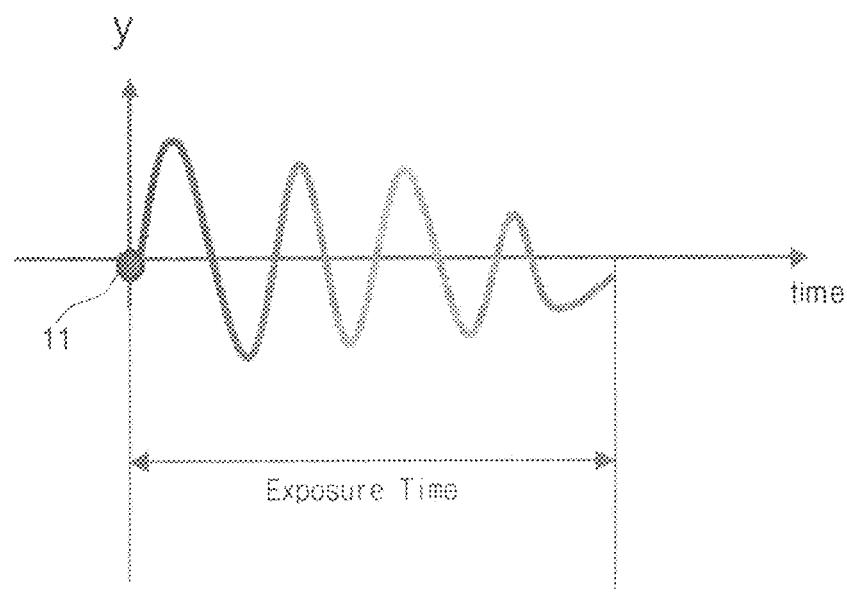
FIG. 6B is a graph showing a state of obtaining a location of the object using the light source of FIG. 6A.
Figure 7A:
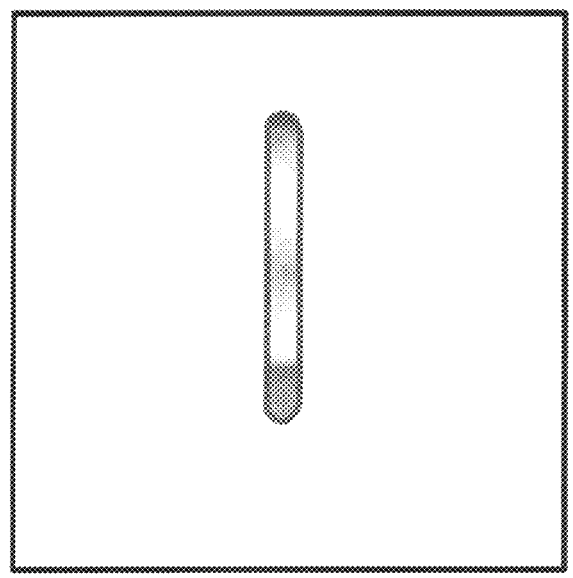
FIG. 7A is a sample image obtained from the object of FIG. 6B without generating the motion blur.
Figure 7B:
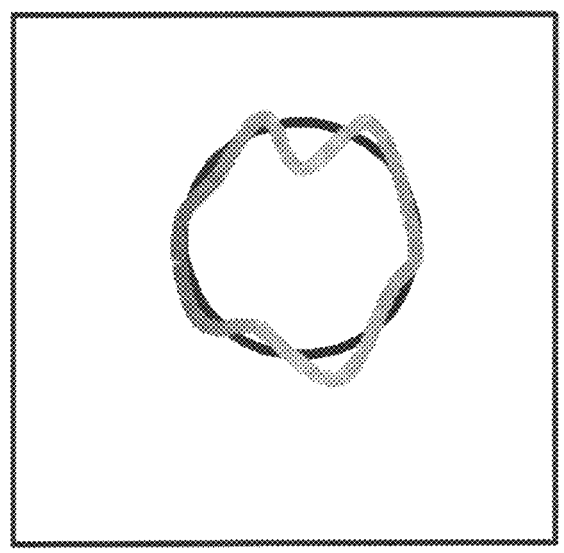
FIG. 7B is a sample image obtained from the object of FIG. 6B with generating the motion blur.

Here, the feature points may be positioned on the different pictured surface. For example, as illustrated in FIG. 5, the fourth point POINT 4 may be positioned on the pictured surface different from the first to third points POINT 1, POINT 2 AND POINT 3. Thus, the motion blurred image for the object 11 may be formed in a three-dimension, and then the three-dimensional location information of the object 11 may be obtained. Here, the number and the position of the feature points and the pictures surfaces may be properly selected, considering the motion state of the object 11. In addition, the reflecting member 15 may be formed to correspond to the plurality of the feature points or the plurality of the pictured surfaces. FIG. 6A is a graph showing a light source, provided by a contactless location information acquisition apparatus according to still another example embodiment of the present invention, and FIG. 6B is a graph showing a state of obtaining a location of the object using the light source of FIG. 6A. FIG. 7A is a sample image obtained from the object of FIG. 6B without generating the motion blur, and FIG. 7B is a sample image obtained from the object of FIG. 6B with generating the motion blur.

The acquisition apparatus according to the present example embodiment is substantially same as the acquisition apparatus 1 in FIG. 1 to FIG. 4D, except that a light L1 irradiated from the light source 14 has a predetermined pattern and the obtained image is different, and thus any repetitive explanation will be omitted.

Referring to FIG. 6A and FIG. 6B, in the present example embodiment, the light L1 provided from the light source 14 may be provided as the pattern having a wavelength changed along the exposure time.

As illustrated in FIG. 6A, the light L1 provided from the light source 14 is provided as the red light R having a first wavelength for a first time, as the green light G having a second wavelength for a second time, and as the blue light B having a third wavelength for a third time.

Here, during the provided time, the intensity of each of the red light, the green light and the blue light may be linearly increased and decreased.

In addition, the first time, the second time and the third time are substantially the same with each other. The first time partially overlaps with the second time, and the second time partially overlaps with the third time.

When the light L1 having a pattern in which the wavelength is changed with a predetermined pattern, is provided from the light source 14 and the object 11 to be pictured moves for the exposure time as in FIG. 6B, the movement of the object 11 and the light pattern having the changed wavelength are inputted at the same time.

Then, as illustrated in FIG. 7A, even though additional motion blur is not provided by the modulation part 13, the image information obtained on the movement of the object 11 includes the information on the light pattern and the both information is extracted.

However, as explained above and in the explanation followed, from the movement of the object 11 obtained without any additional motion blur, the movement information of the object 11 may not be extracted precisely or accurately, and thus in the present example embodiment, the additional motion blur should be provided by the modulation part 13.

Thus, as illustrated in FIG. 7b, the movement information of the object 11 extracted with the motion blur may include the information on the light pattern at the same time.

In the acquisition apparatus 1 explained referring to FIG. 1, the modulation part 13 induces the predetermined first pattern $P_1$ to the imaging part 12, to provide the motion blur, but the first pattern $P_1$ may be partially or entirely the same as or very similar to the movement of the object 11 in some cases. Alternatively, as the object 11 moves with relatively high frequency, more increased resolution may be necessary to extract the movement information of the object 11.

Thus, as in the present example embodiment, when the light L1 from the light source 14 has the specific pattern in which the wavelength of the light has the predetermined pattern as explained above, the information on the light frequency pattern is added, and thus the time resolution of the acquisition apparatus is more enhanced. Then, the information on the movement state of the object 11 according to the time may be obtained more precisely and more accurately.

Figure 8A:
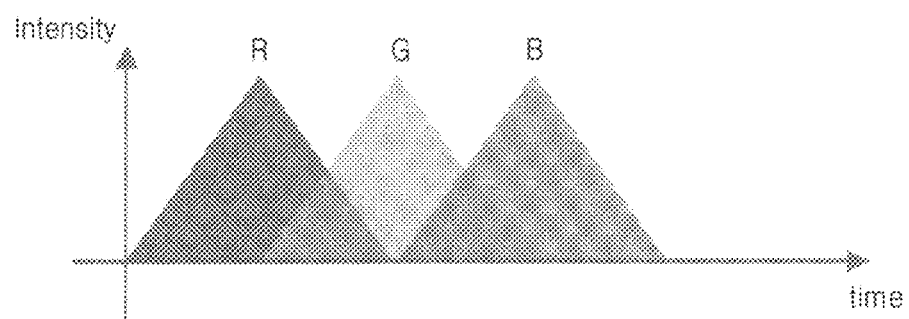
FIG. 8A is a graph showing a light source, provided by a contactless location information acquisition apparatus according to still another example embodiment of the present invention.
Figure 8B:
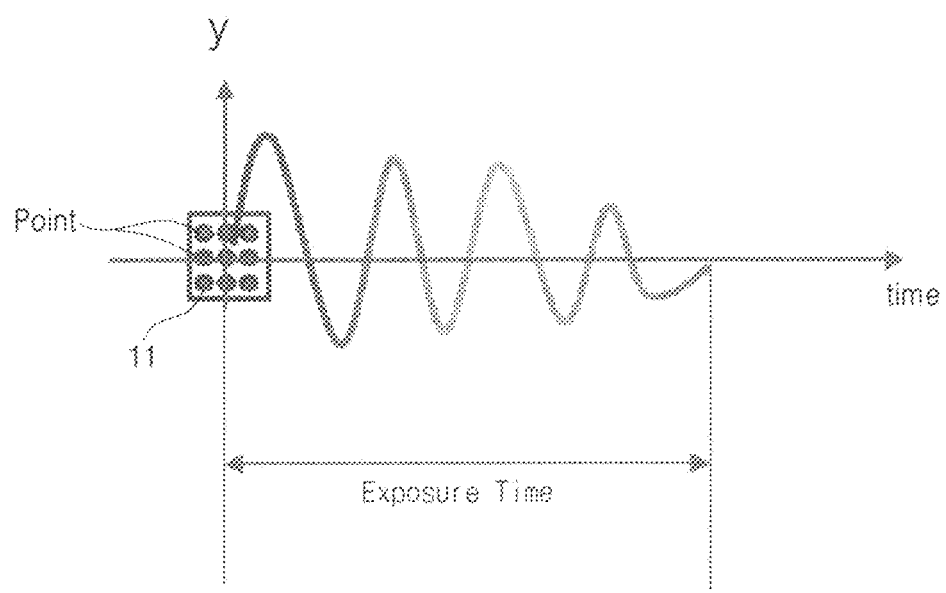
FIG. 8B is a graph showing a state of obtaining a location of the object having a plurality of feature points, using the light source of FIG. 8A.
Figure 9:
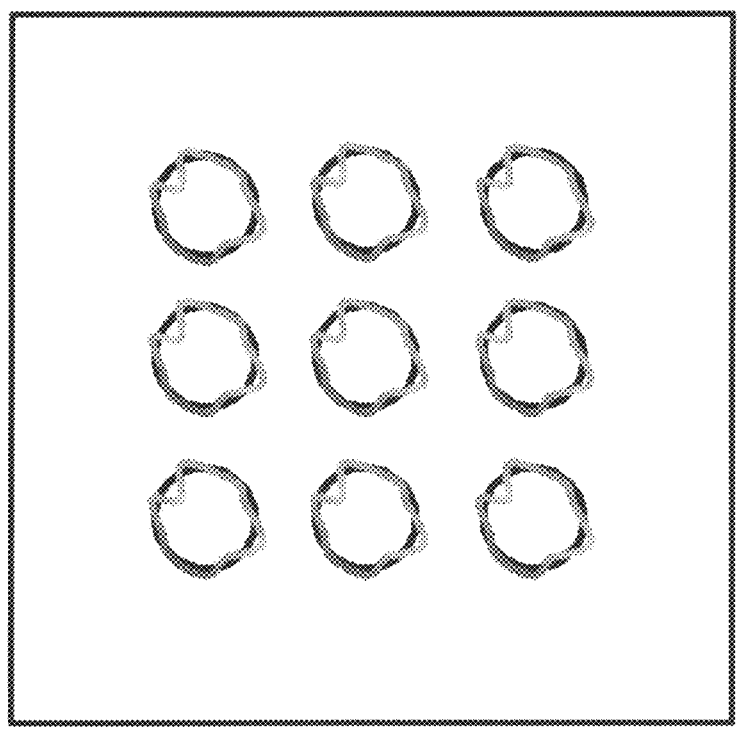
FIG. 9 is a sample image obtained from the feature points of the object of FIG. 8B using one of cameras, with generating the motion blur.

FIG. 8A is a graph showing a light source, provided by a contactless location information acquisition apparatus according to still another example embodiment of the present invention, and FIG. 8B is a graph showing a state of obtaining a location of the object having a plurality of feature points, using the light source of FIG. 8A. FIG. 9 is a sample image obtained from the feature points of the object of FIG. 8B using one of cameras, with generating the motion blur.

The acquisition apparatus according to the present example embodiment is substantially same as the acquisition apparatus in FIG. 6A to FIG. 7B, except that a plurality of cameras is used to take picture of a plurality of feature points of the object 11, and thus any repetitive explanation will be omitted.

In the present example embodiment, referring to FIG. 8A, the light L1 from the light source 14 is provided to have the pattern having the different wavelength for the exposed time, and the pattern is the same as explained referring to FIG. 6A.

Accordingly, when the light L1 having the pattern in which the wavelength is changed is provided from the light source 14, as illustrated in FIG. 7B, and the object 11 having the plurality of feature points moves in a predetermined pattern for the exposure time, the information on the movement of the object 11 and the information on the light having the changed wavelength pattern are provided at the same time.

Thus, as illustrated in FIG. 9, with the motion blur provided, the information on the light pattern is added into the information on the movement of the object 11 which is obtained as a result of imaging the feature points in any one camera, at the same time, and then the information on the light pattern and on the movement of the object 11 are extracted at the same time.

Accordingly, in the present example embodiment, when the light L1 provided from the light source 14 is provided to have the specific pattern in which the wavelengths different from each other have the predetermined pattern, the time resolution of the acquisition apparatus is enhanced since the information on the wavelength pattern of the light is additionally included. Thus, the movement state of the object 11 according to the time may be obtained more precisely and more accurately.

The pattern of the light L1 provided from the light source 14 may be changed variously, and examples of the pattern are explained below.

FIG. 10A, FIG. 10B, FIG. 10C and FIG. 10D are graphs showing light sources, provided by a contactless location information acquisition apparatus according to still another example embodiment of the present invention.

Figure 10A:
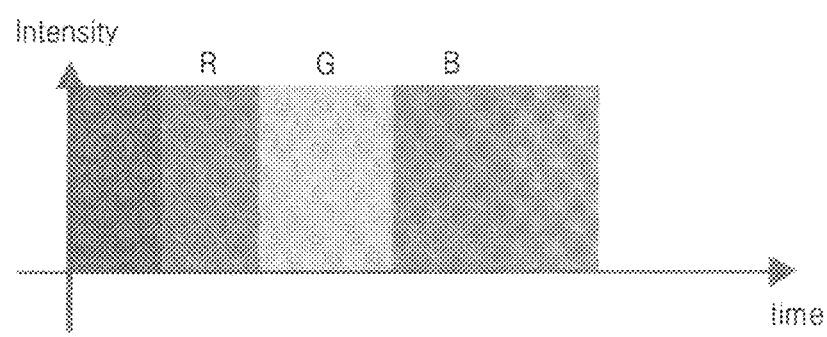
FIG. 10A, FIG. 10B, FIG. 10C and FIG. 10D are graphs showing light sources, provided by a contactless location information acquisition apparatus according to still another example embodiment of the present invention.

Referring to FIG. 10A, the red light R may be provided with the same intensity for the first time, and the green light G may be provided with the same intensity for the second time, and the blue light R may be provided with the same intensity for the third time.

In addition, the first time in which the red light is provided may partially overlap with the second time in which the green light is provided, and the second time in which the green light is provided may partially overlap with the third time in which the blue light is provided.

Figure 10B:
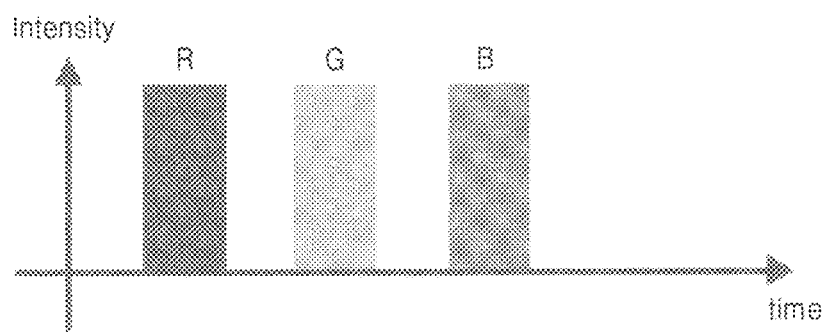

Alternatively, referring to FIG. 10B, the first time in which the red light R is provided, the second time in which the green light G is provided, and the third time in which the blue light B is provided, may be intermittently with a predetermined time interval from each other.

Figure 10C:
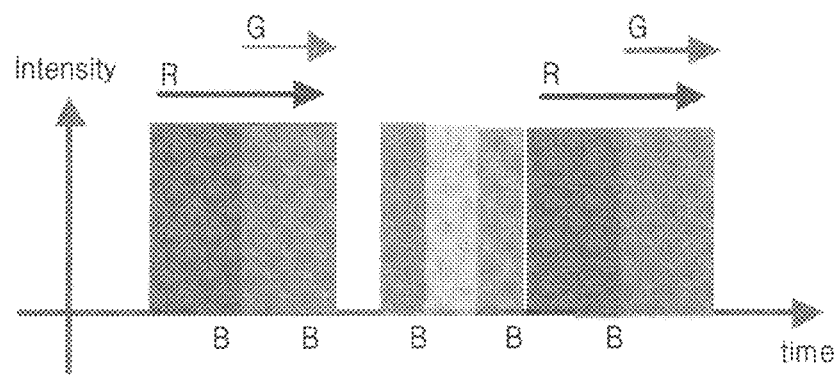

Alternatively, referring to FIG. 10C, the red light R may be continuously provided in a constant time, the green light G may be continuously provided in a time shorter than the time in which the red light R is provided, and the blue light B may be intermittently provided in a time shorter than the time in which the green light G is provided.

Figure 10D:
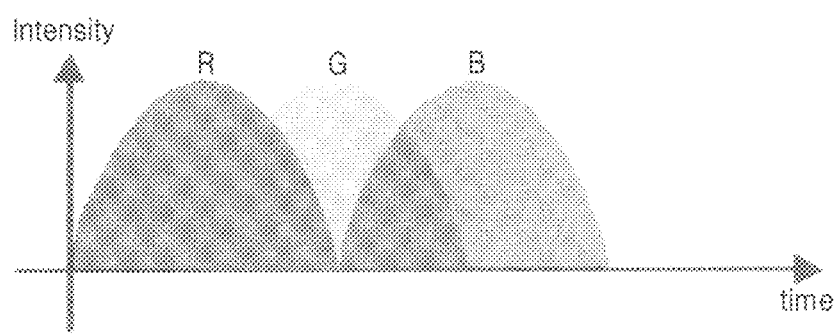

Further, referring to FIG. 10D, the red light R may be provided in the first time, the green light G may be provided in the second time, and the blue light B may be provided in the third time. Here, an intensity of each of the red light, the green light and the blue light may change with a sine shape or a cosine shape. In addition, the first time may partially overlap with the second time, and the second time may partially overlap with the third time.

Accordingly, the intensity or the wavelength of the light L1 from the light source 14 may have the patterns with various combinations of each other, and thus, the information on the light pattern is included in the extracted image information on the movement of the object 11. Then, the resolution of the acquisition apparatus may be more enhanced.

For example, even though the object 11 moves with the same or similar pattern, with partially or entirely overlapping with the first pattern $P_1$ performed by the modulation part 13, or even though the object 11 moves with relatively narrow frequency, the location of the object 11 may be obtained more precisely and more accurately, due to the high resolution of the acquisition apparatus of the present example embodiment.

Figure 11:
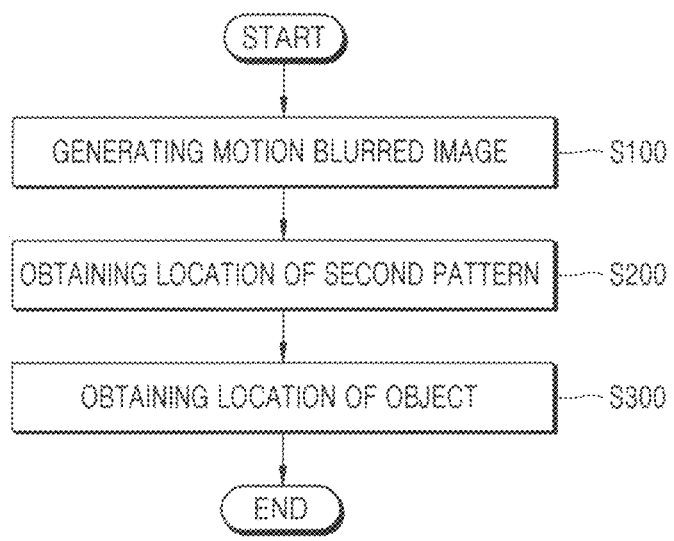
FIG. 11 is a flow chart illustrating a location information acquisition method the acquisition apparatus of FIG. 1.

FIG. 11 is a flow chart illustrating a location information acquisition method the acquisition apparatus of FIG. 1.

Referring to FIG. 1, FIG. 3A to FIG. 3D, and FIG. 6, in the location information acquisition method (hereinafter, acquisition method), the moving object 11 is taken picture of for the exposure time, with moving the imaging part 12 with the predetermined first pattern $P_1$, to generate the motion blurred image having the second pattern $P_2$ (step S100).

In the step S100, the imaging part 12 is moved with the first pattern $P_1$ using the modulation part 13.

During the imaging part 12 takes picture of the object 11, the imaging part 12 is moved with the first pattern $P_1$ using the modulation part 13, so that the imaging part 12 generates the motion blur to the pictured image.

Here, the pictured image is the mix of the movement of the object 11 and the first pattern $P_1$ of the imaging part 12.

In addition, the imaging part 12 may be moved in a whole by the modulation part 13, or the camera or the image sensor of the imaging part 12 may be selectively moved, and the generated motion blurred image has the second pattern $P_2$.

The second pattern $P_2$ of the motion blurred image may be the traceable pattern, differently from the movement of the object 11, and as explained above, the second pattern $P_2$ may be expressed by the polar coordinate system, the Cartesian coordinate system, and so on.

Here, before picturing the object 11 using the imaging part 12, the light may be irradiated to the object 11 using the light source 14.

For example, the light source 14 is positioned to be spaced apart from the object 11, and the reflecting member 15 is disposed on the pictured surface of the object 11. Then, the light is irradiated to the object 11 using the light source 14, and then the light reflected from the reflecting member 15 of the object 11 is taken picture of by the imaging part 12.

Here, to maintain the intensity and the wavelength of the light source 14, for example, the light from the light source 14 may be maintained as the white light having the constant wavelength.

As explained referring to FIG. 6A to FIG. 10, the intensity or the wavelength of the light source 14 may be controlled, and thus, the time resolution may be enhanced in obtaining the location information of the object 11.

Then, the location of the second pattern $P_2$ is obtained from the motion blurred image (step S200).

For example, as explained referring to FIG. 4A to FIG. 4D, the density map of the motion blurred image is obtained, based on the obtained second pattern $P_2$ and the intensity and/or the wavelength of the light recorded to the image sensor of the imaging part 12 for the exposure time. Then, the location of the second pattern $P_2$ is expressed according to the time, based on the density map, the known exposure time and the irradiated time of the light from the light source 14.

Then, the location of the object 11 is obtained for the exposure time, based on the first pattern $P_1$ and the second pattern $P_2$ (step S300).

For example, the location of the object 11 according to the time is obtained, based on the location of the second pattern $P_2$ according to the time and the known location of the first pattern $P_1$. Here, the motion blur is removed from the location information of the second pattern $P_2$ which is obtained by generating the motion blur to the movement of the object 11, to obtain the location of the object 11 reversely.

The acquisition method may be performed by the acquisition apparatus 2 explained referring to FIG. 5. As explained referring to FIG. 5, in the acquisition method using the acquisition apparatus 2 having the imaging part 12 including the first and second cameras 12A and 12B, the first and second cameras 12A and 12B move differently, to take picture of the plurality of the feature points positioned on the plurality of the pictured surfaces of the object 11. Then, the motion blurred images are generated at the feature points, and thus the location of the object 11 may be obtained more precisely and more accurately.

Here, the plurality of the feature points and/or the plurality of the pictured surfaces are formed on the surfaces of the object 11 different from each other, and then the three-dimensional location information of the object 11 may be obtained. The number and the position of the cameras included in the imaging part 12, and the number and the position of the feature points and the pictured surfaces, may be properly selected considering the motion state of the object 11.

Alternatively, in the acquisition method, the first and second cameras 12A and 12B move to form a direction vector $V_A$ of the first camera 12A substantially perpendicular to a direction vector $V_B$ of the second camera 12B. Thus, even though the motion blur is offset according as the object 11 moves substantially the same direction as one of the cameras, the motion blur is generated sufficiently by the remaining camera.

FIG. 12A, FIG. 12B, FIG. 13A and FIG. 13B are graphs for additional explanation on the acquisition apparatus and the acquisition method according to the example embodiments of FIG. 1 to FIG. 11.

Figure 12A:
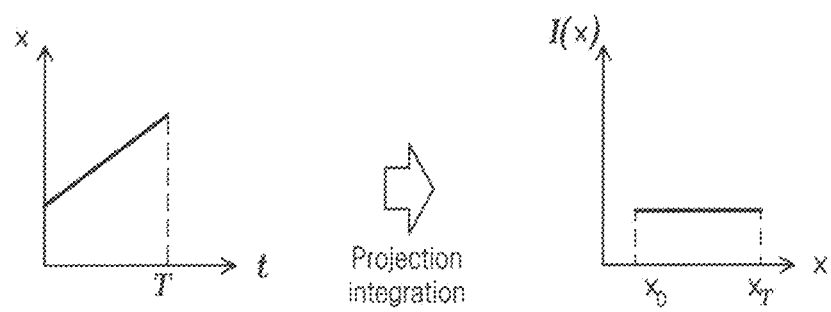
Figure 12B:
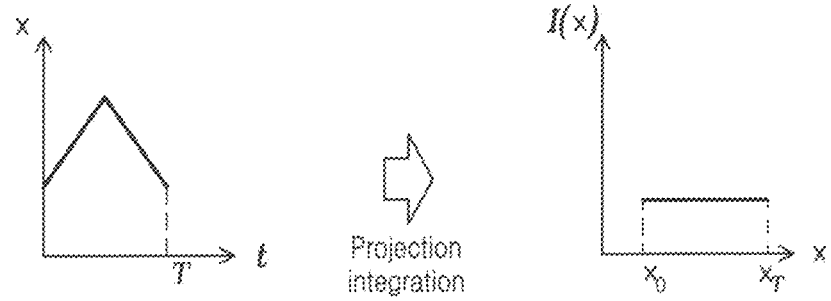

Referring to FIG. 12A and FIG. 12B, when integrating the motion of the object with respect to the time without generating the motion blur, the objects having different movement have the same integration value.

Here, the integration value means the intensity of the light recorded in the image sensor, when the imaging part takes picture of the object for the exposure time. When the object is taken picture of as it is, without any control or modulation to the imaging part, the movement of the object is hard to be reconfigured in time series.

Figure 13B:
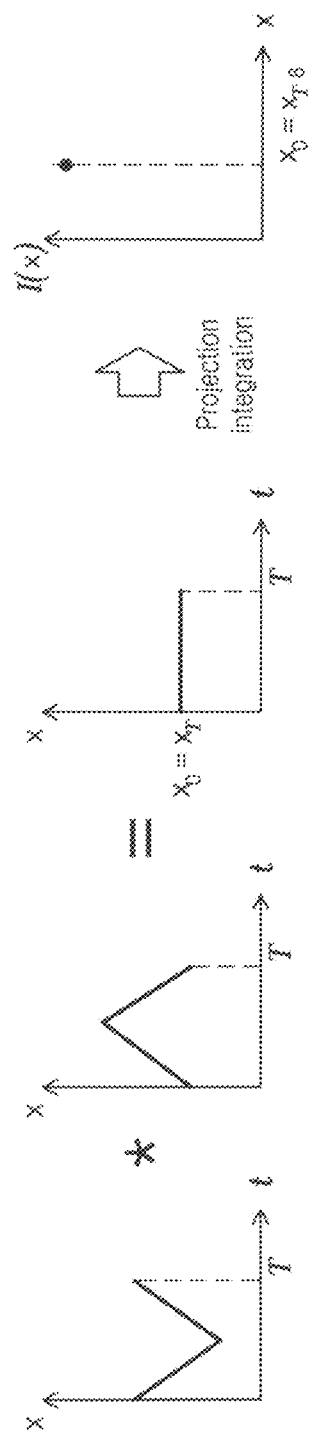

In contrast, referring to FIG. 13A and FIG. 13B, the motion state having new pattern may be generated by calculating the motion state with a random pattern in the movement of the object.

Thus, when integrating the motion state having new pattern with respect to the time, the integration value becomes different. In addition, the movement of the object may be calculated reversely based on the motion state having the random pattern which is the known information, and the newly obtained integration value.

The motion state having new pattern is generated by moving the imaging part for the exposure time in addition to the original movement of the object, and then the movement of the object may be reconfigured in time series.

Accordingly, in the present example embodiment, the movement of the object is pictured with adding the predetermined motion of the imaging part, instead of merely taking picture of the movement of the object, and the movement of the object may be reconfigured in time series. Thus, the movement of the object may be obtained more precisely and more accurately.

Here, when the predetermined motion added to the imaging part is the same as or similar to the movement of the object, the movement of the object may be obtained with the same result and the obtained information may not be accurate. Further, when the movement of the object has relatively high frequency, the movement may be hard to be recognized.

Thus, as explained referring to FIG. 6A to FIG. 10D, the intensity of the irradiated light or the wavelength of the irradiated light is changed to have the predetermined pattern in taking picture of the object. Then, the movement of the object may be clearly recognized and the movement information of the object may be obtained more precisely and accurately, even though the predetermined motion added to the imaging part is the same as or similar to the movement of the object or the movement of the object has relatively high frequency.

According to the present example embodiment, the imaging part for taking picture of the object moves in a random pattern, and the motion blur is generated to the pictured image, and thus the movement of the object may be obtained reversely.

In addition, the results are not limited by a frame rate of the imaging part, and time resolution is increased by controlling the light source, so that the location of the object moving with relatively high frequency may be obtained with high resolution, high accuracy and high precision.

Here, the moving pattern of the imaging part, the intensity of the light or the wavelength of the light from the light source are controlled according to the time, and thus the time resolution may be increased in obtaining the location of the object. Thus, the results are not limited by the frame rate of the camera, and the location of the object moving with relatively high frequency may be obtained with high resolution, high accuracy and high precision, without a high performance image processor.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An acquisition apparatus comprising:
    an imaging part spaced apart from a moving object, and configured to take a picture of the object in a predetermined exposure time to provide a pictured image;
    a modulation part configured to generate a motion blur to the pictured image by moving the imaging part along a predetermined first pattern, the motion blurred image having a second pattern,
    the second pattern is a sum of movement of the object and the predetermined first pattern; and
    a controller configured to obtain a location of the object from the motion blurred image for the exposure time by excluding movement of the predetermined first pattern on movement of the second pattern,
    wherein the imaging part comprises a plurality of cameras configured to take pictures of each of feature points of the object, and
    the modulation part is configured to move each the plurality of cameras with respective different patterns to form direction vectors of the plurality of cameras substantially perpendicular to each other.

2. The acquisition apparatus of claim 1, further comprising:
    a light source spaced apart from the object, and configured to irradiate light to the object; and
    a reflecting member attached to a pictured surface of the object, and configured to reflect the light irradiated from the light source,
    wherein the imaging part is configured to take a picture of the light reflected from the reflecting member, to obtain the pictured image.

3. The acquisition apparatus of claim 2, wherein the controller is configured to obtain the location of the object according to time, based on a location of the predetermined first pattern and a location of the second pattern.

4. The acquisition apparatus of claim 3, wherein the controller is configured to obtain the location of the object according to the time, and further based on a pattern of the light irradiated from the light source.

5. The acquisition apparatus of claim 4, wherein the pattern of the light is provided by changing at least one of light intensity and light wavelength for the exposure time into a predetermined pattern.

6. The acquisition apparatus of claim 5, wherein the light source is a light emitting diode (LED), and a red light, a green light and a blue light of the LED are emitted sequentially with the predetermined pattern or at a same time to provide the pattern of the light.

7. The acquisition apparatus of claim 1, wherein at least one feature point of the feature points is located on a surface different from a surface of the object on which other feature points from among the feature points are formed.

8. An acquisition method comprising:
    moving an imaging part with a predetermined first pattern and taking a picture of a moving object in a predetermined exposure time, to generate a motion blurred image having a second pattern,
    the second pattern is a sum of movement of the object and the predetermined first pattern;
    obtaining a location of the second pattern from the motion blurred image; and
    obtaining a location of the object for the exposure time, based on the predetermined first pattern and the second pattern, by excluding movement of the predetermined first pattern on movement of the second pattern,
    wherein said taking the picture comprises
    taking pictures of each of feature points of the object, using the imaging part having a plurality of cameras, and
    each of the plurality of cameras moves with a different pattern, to form direction vectors of the plurality of cameras substantially perpendicular to each other.

9. The acquisition method of claim 8, wherein said moving the imaging part comprises:
    using a modulation part connected to the imaging part to move at least one of a body, a lens and an image sensor of the imaging part with the predetermined first pattern for the exposure time.

10. The acquisition method of claim 8, further comprising:
    irradiating light to the object from a light source spaced apart from the object, to generate the motion blurred image based on reflected light from the object.

11. The acquisition method of claim 10, wherein said obtaining the location of the object comprises
    obtaining the location of the object according to time, based on the location of the first pattern and the location of the second pattern.

12. The acquisition method of claim 10, wherein said irradiating the light to the object comprises
    changing at least one of light intensity and light wavelength of the light irradiated to the object into a predetermined pattern.

13. The acquisition method of claim 12, wherein said obtaining the location of the object comprises
    obtaining the location of the object according to time, and further based on a pattern of the light irradiated from the light source.

* * * * *